United States Patent [19]

Gerstner

[11] Patent Number: 4,576,391

[45] Date of Patent: Mar. 18, 1986

[54] ROLLABLE PALLET ASSEMBLY AND CASTER DEVICE

[76] Inventor: Michael Gerstner, 11555 Hamlin, #3, North Hollywood, Calif. 91606

[21] Appl. No.: 513,811

[22] Filed: Jul. 15, 1983

[51] Int. Cl.$^4$ .............................................. B62B 1/04
[52] U.S. Cl. .................................... 280/79.1 R; 16/30
[58] Field of Search .................... 280/47.32, 47.37 R, 280/79.1 R, 47.13 R, 47.13 B, 79.1 A, 79.3; 108/51.1; 312/250; 248/129; 16/30

[56] References Cited

U.S. PATENT DOCUMENTS

| | | | |
|---|---|---|---|
| 113,263 | 4/1871 | Cochran | 280/79.1 R |
| 853,086 | 5/1907 | Jacquart | 108/51.1 |
| 1,790,019 | 1/1931 | Raymond | 108/51.1 |
| 1,993,237 | 3/1935 | Barrett | 108/51.1 |
| 2,049,344 | 7/1936 | Wittke, Jr. | 16/30 |
| 2,132,316 | 10/1938 | Newton | 280/79.1 A |
| 2,370,548 | 2/1945 | Kordes | 280/79.1 |
| 2,414,277 | 1/1947 | Shepard, Jr. et al. | 280/79.1 R |
| 2,455,048 | 11/1948 | Dubrie | 16/30 |
| 2,782,045 | 2/1957 | Hulbert | 280/79.1 R |
| 2,794,611 | 6/1957 | Sjöblom et al. | 108/51.1 |
| 2,819,859 | 1/1958 | Garbarino | 108/51.1 |
| 3,001,797 | 9/1961 | Kappen | 280/46 |
| 3,058,770 | 10/1962 | Hutchinson | 280/79.1 R |
| 3,761,107 | 9/1973 | Docherty et al. | 16/30 |
| 3,884,493 | 5/1975 | Weir et al. | 280/79.1 R |
| 4,077,644 | 3/1978 | Roby et al. | 280/79.1 R |
| 4,166,638 | 9/1979 | De Prado | 280/79.1 R |

FOREIGN PATENT DOCUMENTS 701719 3/1966 Italy .................................. 280/79.1

Primary Examiner—David M. Mitchell
Assistant Examiner—Eric D. Culbreth
Attorney, Agent, or Firm—John J. Posta, Jr.

[57] ABSTRACT

The assembly comprises a flat pallet of extended surface area and a plurality of knock-off caster devices of improved type releasably secured to the pallet. Each caster device includes upper and lower horizontal plates joined at one end by a vertical web to form a sleeve in which an edge or end of the pallet is releasably secured by anchoring spikes, nuts or the like. A caster bracket is secured to the underside of the lower plate and a rotatable caster depends therefrom. A flange, detent or the like is provided to facilitate knock-off of the caster device from the pallet when the device is no longer needed. Preferably, the caster device is adjustable in plate length, sleeve height and/or caster position. The device may include a type which has a pair of casters, brackets and sleeves on opposite ends of the lower plate, which is adjustable to span the pallet. In a second type, the lower plate spans the pallet and has an upturned end abutting the pallet end and bearing a flange. In another embodiment, the device is configured and dimensioned such that the sleeve receives a whole corner of the pallet. Each caster device is inexpensive, durable, efficient and easy to install on and remove from the pallet.

4 Claims, 7 Drawing Figures

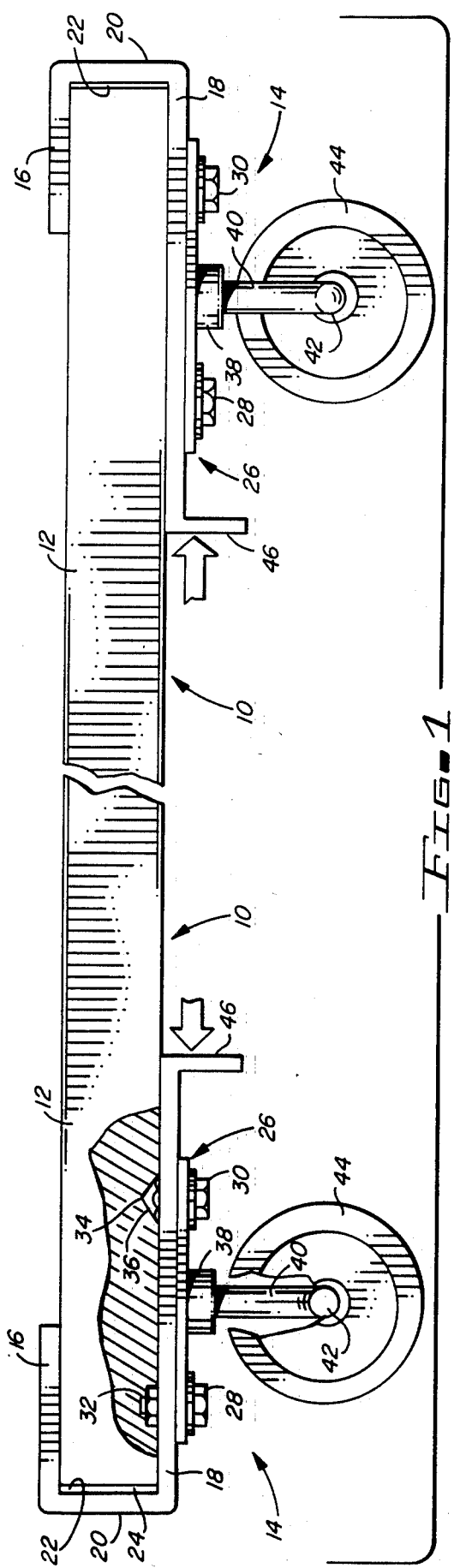
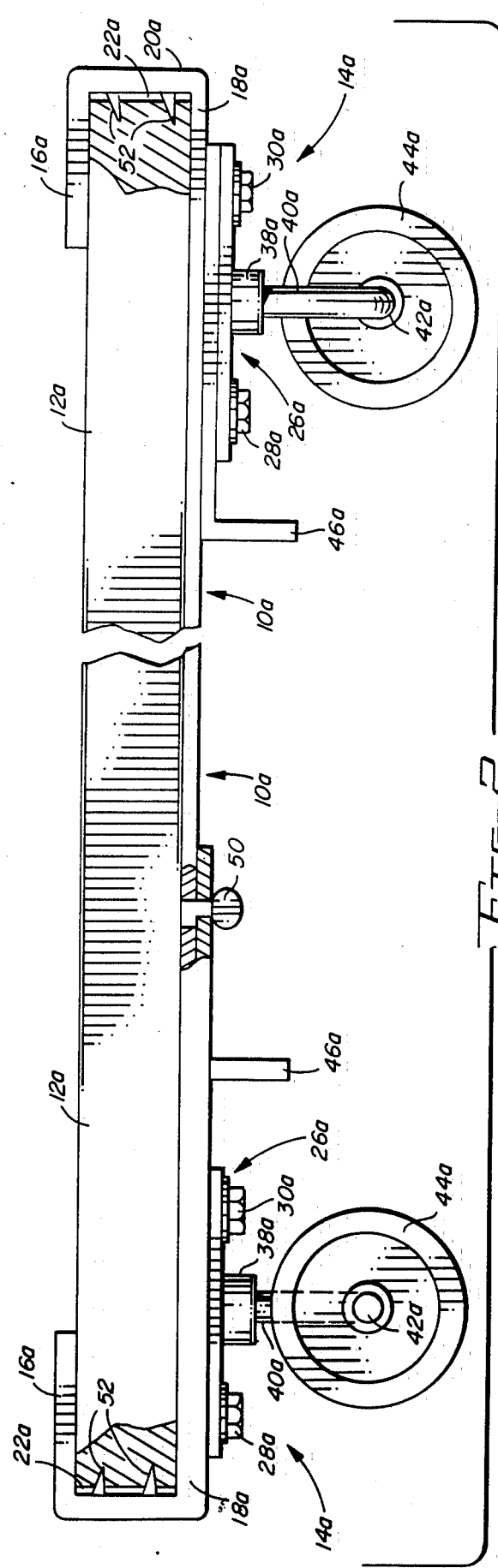

ROLLABLE PALLET ASSEMBLY AND CASTER DEVICE

BACKGROUND OF THE INVENTION

1. Field of the Invention

The present invention generally relates to loading pallets and more particularly to improved pallets bearing readily removable caster devices of an improved type.

2. Prior Art

Conventional wooden pallets are used for storage of various items and normally do not include wheels or other means for moving them. When it is desired to move them, they must be picked up, by hand or by a fork-lift truck or the like and hauled by the truck or placed on a wheeled dolly or truck for hauling, such as is shown, for example, in U.S. Pat. No. 4,077,644, in U.S. Pat. No, 3,001,797, and in U.S. Pat. No. 3,058,770. These procedures take considerable time and effort and require the use of various types of equipment.

Accordingly, there is a need for an improved inexpensive type of loading pallet which can be easily maneuvered with a minimum amount of effort from one location to another, and without the use of a dolly, fork-lift truck or the like and which can also be easily and compactly stored.

SUMMARY OF THE INVENTION

The improved rollable pallet assembly and caster device of the present invention satisfy the foregoing needs. The assembly and device are substantially as set forth in the Abstract above. Thus, the assembly has a flat pallet to which are removably affixed a plurality of spaced, knock-off caster devices. The devices are rapidly and easily installed on the pallet for transportation of the pallet and are just as easily and rapidly removed from the pallet when it is desired to store the pallet.

Each such device includes a rotatable caster secured by a bracket to the underside of a horizontal plate. Another horizontal plate is held in spaced relation thereto by a vertical web at one end of the plates. A pocket or sleeve is formed thereby in which an edge, such as a corner, of the pallet is held by anchoring means such as sharpened nuts which with associated bolts connect the caster bracket to the lower plate. The plates and/or web may also bear spiked surfaces for the same purpose.

A flange, knob, detent or the like may be provided on one of the plates to facilitate knocking the caster device from the pallet. The device may be adjustable in plate length, caster height and/or sleeve depth. Moreover, it can be designed to cover on entire corner of the pallet or to span the pallet so as to provide a caster and sleeve at one or both of the opposite ends of the pallet. The device is simple, inexpensive, light in weight, durable and efficient. Other features of the invention are set forth in the following detailed description and accompanying drawings.

BRIEF DESCRIPTION OF THE DRAWINGS

FIG. 1 is a schematic fragmentary side elevation, party broken away, of a first preferred embodiment of the improved pallet assembly of the present invention.

FIG. 2 is a schematic fragmentary side elevation, partly broken away, of a second preferred embodiment of the improved pallet assembly of the present invention.

DETAILED DESCRIPTION OF THE PREFERRED EMBODIMENTS

FIG. 1

Figure 3:
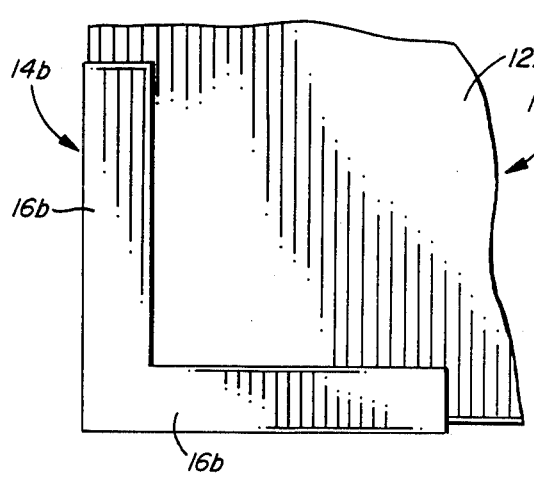
FIG. 3 is a schematic, fragmentary top plan view of a third preferred embodiment of the improved pallet assembly of the present invention.

Now referring more particularly to FIG. 1 of the accompanying drawings, a first preferred embodiment of the pallet assembly of the invention is schematically depicted therein. Thus, assembly 10 is shown which comprises a flat pallet 12 of wood, plastic or the like which is of extended surface area. A spaced pair of improved caster devices 14 are releasably connected to pallet 12. Each device 14 comprises a short, upper horizontal plate 16, a longer lower horizontal plate 18, and a vertical wall or web 20 interconnecting one end of plates 16 and 18 to form a sleeve 22 having a space of, for example, a depth of about 1 inch, within which an edge or end 24 of pallet 12 is disposed.

A bracket 26 is secured to the underside of plate 18 by bolts 28 and 30 bearing nuts 32 and 34, respectively. It will be noted that nut 34 has a pointed top 36 adapted to engage pallet 12 to help anchor device 14 in place on pallet 12. Bracket 26 includes a depending tubular socket 38 to which is rotatably secured a depending shaft 40 also secured to the hub 42 of a caster wheel 44 of nylon, polyurethane or the like. Wheel 44 rotates freely 360° with a shaft 40.

Device 14 is easily installed on pallet 12, by tapping it in place with a hammer, sleeve 22 positioning device 14 correctly on pallet 12 and nuts 32 and 34 securing device 14 against movement while it is in use on pallet 12. It will be understood that a plurality of devices 14 are installed in spaced relation on pallet 12 to properly support it. A depending flange 46 at the inner end of plate 18 facilitates quick removal of each device 14 from pallet 12 by knocking flange 46 with a hammer in the direction indicated by the appropriate arrow. Pallet 12 can be rapidly cleared of devices 14 for flat storage, when desired.

The components of device 14 can be made of various conventional inexpensive materials, such as steel or iron or the like (plates 16 and 18, web 20 and bracket 26) for durability and ease of use.

FIG. 2

A second preferred embodiment of the improved pallet assembly of the present invention is schematically depicted in FIG. 2. Components similar to those of FIG. 1 bear the same numerals but are succeeded by the letter "a". Thus, assembly 10a is shown which includes pallet 12a bridged by device 14a which comprises a pair of sleeves 20 formed of upper plates 16a, webs 20a and lower plates 18a, the latter slideably interconnected and releasably secured by a key 50. Plates 18a span pallet 12a and bear a pair of brackets 26a and wheels 44a at opposite ends thereof. Spikes 52 protrude from the inner surfaces of webs 20a into pallet 12a, releasably securing device 14a in place on pallet 12a, while flanges 46a are provided for easy knock-off removal of device 14a from pallet 12a after key 50 is loosened so that plates 18a can be slid apart. Thus, device 14a serves the purpose of and is quite similar to a pair of devices 14. Moreover, device 14a is easily adaptable to pallets 12a of various lengths and widths.

Figure 4:
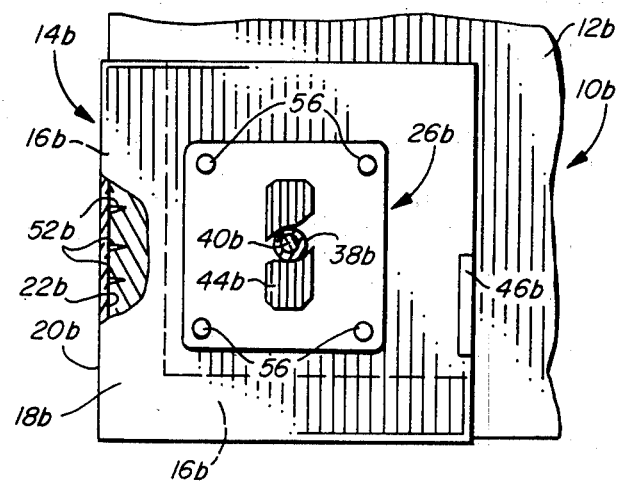
FIG. 4 is a schematic, fragmentary bottom plan view of the embodiment of FIG. 3.

FIGS. 3 and 4

Now referring to FIGS. 3 and 4 of the accompanying drawings, a third preferred embodiment of the improved pallet assembly of the present invention is schematically depicted therein. Components thereof similar to those of FIGS. 1 or 2 bear the same numerals but are succeeded by the letter "b". Thus, assembly 10b is shown which comprises a flat pallet 12b and four caster devices 14b and of which is shown in FIGS. 3 and 4. Each device 14b is designed to cover a corner of pallet 12a. Thus, plate 16b is shown in an L-shaped configuration, while plate 18b is rectangular. Web 20b joins plates 16b and 18b at their outer edges to form sleeve 22b in which the entire corner of pallet 12b is inserted. Web 20b has spikes 52b protruding into pallet 12b to hold device 14b thereto. Bracket 26b is secured to plate 18b by four rivets 56 and wheel 44b is centered on bracket 26b by socket 38b and shaft 40b. Device 14b function similarly to device 14a, which has the same advantages and can be fabricated of similar materials.

FIG. 5

Figure 5:
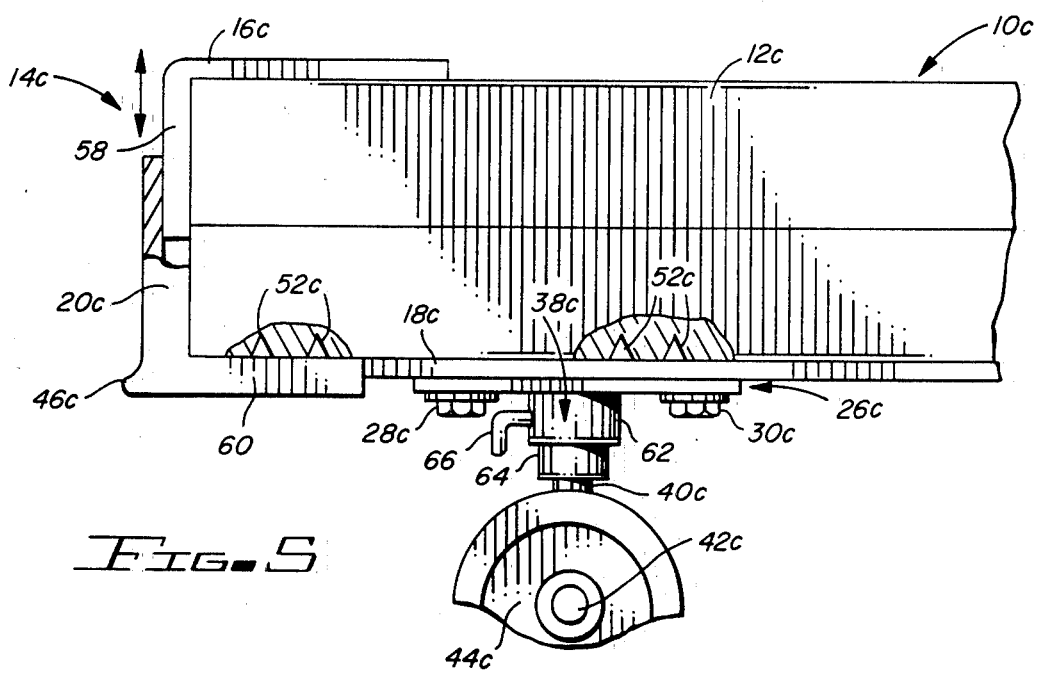
FIG. 5 is a schematic, fragmentary side elevation, partly broken away, of a fourth preferred embodiment of the improved pallet assembly of the present invention.

A fourth preferred embodiment of the improved pallet assembly of the present invention is schematically depicted in FIG. 5. Components thereof similar to those of any of FIGS. 1 through 4 bear the same numerals but are succeeded by the letter "c". Thus, assembly 10c is shown which includes pallet 12c and a plurality of devices 14c. Each device 14c includes plate 16c, web 20c and plate 18c. However, web 20c slideably receives a depending leg 58 of plate 16c and in turn includes a lower horizontal portion 60 which slideably receives plate 18c and which bears flange 46c. Thus, sleeve 22c is adjustable in depth to accommodate various thicknesses of pallet 12c and device 14c is adjustable in effective length of plate 18c so as to permit wheel 44c to be positioned advantageously at various locations with respect to pallet 12c. Spikes 52c protrude from portion 60 and plate 18c to releasable anchor device 14 to pallet 12c.

Moreover, the height of wheel 44c is adjustable because socket 38c comprises two telescoping portions 62 and 64 releasably and adjustably secured together by screw 66, as shown in FIG. 5. Thus, device 14c is readily adaptable to various pallets 12c and allows a maximum of adjustability in a simple effective manner.

Figure 6:
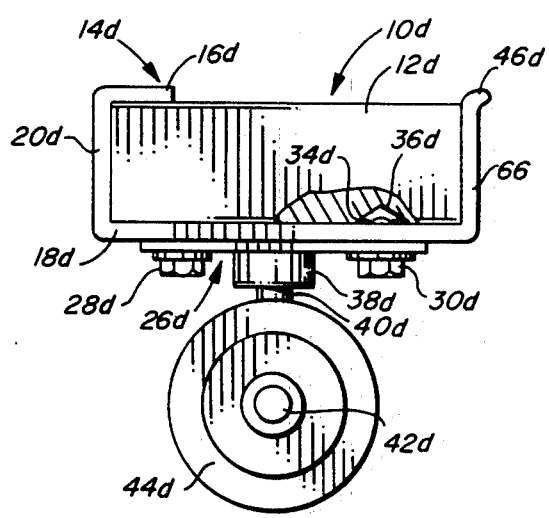
FIG. 6 is a schematic, fragmentary side elevation of a fifth preferred embodiment of the improved pallet assembly of the present invention.
Figure 7:
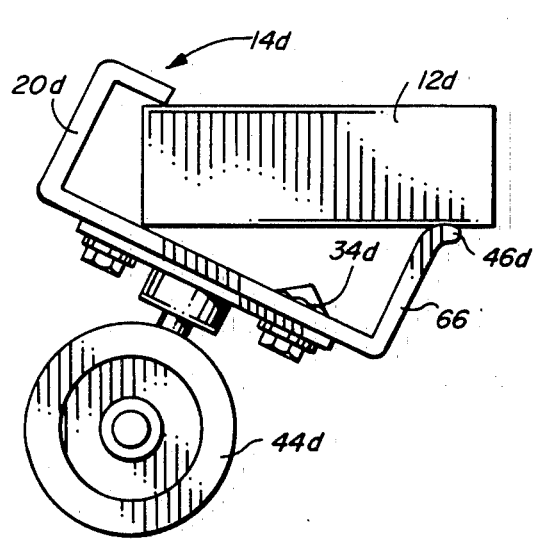
FIG. 7 is a schematic of the assembly of FIG. 6, prior to attachment to the pallet.

FIGS. 6 and 7

A fifth preferred embodiment of the improved pallet assembly of the present invention is schematically depicted in FIG. 6. Components thereof similar to those of any of FIGS. 1 through 5 bear the same numerals but are succeeded by the letter "d". This embodiment would have particular application to pallets made from a plurality of boards extending at right angles to one another forming an open web pattern. The assembly 10d would be secured at one or more corners of such a slab so as to traverse the width of one of said board. Thus, assembly 10d is shown which includes pallet 12d and device 14d. Device 14d includes plates 16d and 18d interconnected by web 20d. Bracket 26d is secured to plate 18d by bolts 30d bearing spiked nuts 34d to hold device 14d in place. Bracket 26d bears caster wheel 44d. Plate 18d is of sufficient length to span and embrace the width of board 12d and includes an upturned end 66, as shown in FIG. 6, which end 66 abuts pallet 12d and terminates with flange 46d. End 66 can be made of resilient material thereto, so that it tightly grips pallet 12d but so that device 14d still can be removed from pallet 12d by tapping on flange 46d with a hammer in the direction of the arrow shown in FIG. 6. Device 14d has substantially the advantages of devices 14, 14a, 14b and 14c and can be fabricated of similar materials.

FIG. 7 shows a method by which device 14d can be secured to a pallet. The board 12d of a pallet can be raised off the ground, as by a fork-lift truck, and which raised, the device 14d can be placed partially over board 12d. As the board 12d is then lowered to the ground, device 14d is automatically forced and rotated into the position shown in FIG. 6, with spiked nut 34d retaining device 14d in place.

Various other modifications, changes, alterations and additions can be made in the improved rollable pallet assembly of the present invention, its components, including the novel caster device of the present invention and the parameters thereof. All such modifications changes, alterations and additions as are within the scope of the appended claims form part of the present invention.

What is claimed is:

1. An improved knock-off caster device for a pallet, said device comprising, in combination:
   (a) an upper generally horizontal plate,
   (b) a lower generally horizontal plate,
   (c) a first generally vertical web interconnecting said plates at one end thereof,
   (d) a second generally vertically extending plate connected to the opposite end of said lower plate, and extending to an upper terminus, said upper terminus being free from any structure which extends toward said upper plate, said second plate lying opposite said web and extending upwardly from said lower plate in a first plane,
   (e) said upper plate having a length substantially shorter than the length of said lower plate to thereby define an opening extending between the opposite end of said upper plate and said first plane, whereby a member of said pallet can be inserted through said opening and into the cavity formed by said plates and web,
   (f) a caster bracket connected to the underside of said second plate, and
   (g) a caster rotatably secured to and depending from said bracket.

2. A caster assembly for a pallet comprising:
   (a) a horizontal base plate,
   (b) a first upwardly extending plate connected at its lower end to one end of said base plate,
   (c) a second upwardly extending plate lying substantially within a single plane, connected at its lower end to the opposite end of said base plate and extending to an upper terminus, said upper terminus being free from any structure which extends toward said upper plate, (d) a third plate extending horizontally and substantially parallel to said base plate,
(e) said third plate being connected at one end thereof to the upper end of said first upwardly extending plate,
(f) said base plate having a length significantly greater than said third plate, such that a void space is provided in the area between one end of said third plate and said single plane,
(g) said plates defining a cavity adapted to receive and retain a board on a pallet,
(h) a caster bracket secured to the underside of said first plate, and
(i) a caster secured to said caster bracket.

3. An improved knock-off caster device for a pallet, said device comprising, in combination:
(a) an upper generally horizontal plate,
(b) a lower generally horizontal plate,
(c) a first generally vertical web interconnecting said plates at one end thereof,
(d) a second generally vertically extending plate connected to the opposite end of said lower plate, said second plate lying opposite said web and extending upwardly from said lower plate,
(e) said upper plate having a length substantially shorter than the length of said lower plate, whereby a member of said pallet can be inserted into the cavity formed by said plates and web,
(f) a caster bracket connected to the underside of said second plate,
(g) a caster rotatably secured to and depending from said bracket,
(h) wherein said device includes a flange adapted to be struck to facilitate knocking off said device from a pallet, and
(i) wherein said flange is secured to the top of said second vertically extending plate.

4. The caster device of claim 3 wherein said second vertical plate is resilient.

* * * * *